United States Patent [19]

Rutty et al.

[11] 4,067,513
[45] Jan. 10, 1978

[54] COILABLE RULE AND REPLACEMENT CARTRIDGE THEREFOR

[75] Inventors: Edward Charles Rutty, Portland; Frank Gregory Czerwinski, New Britain; Henderik Van Zelderen, Avon; Donald Robert Gavini, South Windsor, all of Conn.

[73] Assignee: The Stanley Works, New Britain, Conn.

[21] Appl. No.: 750,112

[22] Filed: Dec. 13, 1976

[51] Int. Cl.² ............................................ B65H 75/48
[52] U.S. Cl. ................................ 242/107.3; 242/84.8
[58] Field of Search .......... 242/107.3, 107 R, 107.12, 242/107.2, 107.6, 84.8; 33/138

[56] References Cited

U.S. PATENT DOCUMENTS

| 2,893,655 | 7/1959 | Carlson | 242/84.8 |
|---|---|---|---|
| 3,214,836 | 11/1965 | West | 242/107.3 X |
| 3,716,201 | 2/1973 | West | 242/107.3 |
| 3,942,738 | 3/1976 | Rutty | 242/107.3 X |

FOREIGN PATENT DOCUMENTS

2,440,750   4/1975   Germany ........................... 242/107.3

*Primary Examiner*—Edward J. McCarthy
*Attorney, Agent, or Firm*—Prutzman, Hayes, Kalb & Chilton

[57] ABSTRACT

A coilable rule having a replacement cartridge comprising a hub, a spool for winding the tape and a keeper for maintaining the cartridge in factory adjusted position until it is field-installed in the tape casing is disclosed. The spool has a single side flange journaled on a hollow hub which is non-rotatably mounted within the casing with the hub providing a second side flange to define an annular spring chamber with the hub flange spaced from the spool by an annular clearance to prevent frictional contact and provide a unit bearing construction for the spool so that the spool is self-aligning. The keeper is snap-fitted into one of a plurality of non-circular openings in the hub flange and a central post passing through the hollow hub fixes the distance between the sidewalls of the casing to provide an axial clearance with the hub to accommodate the axial movement thereof.

7 Claims, 2 Drawing Figures

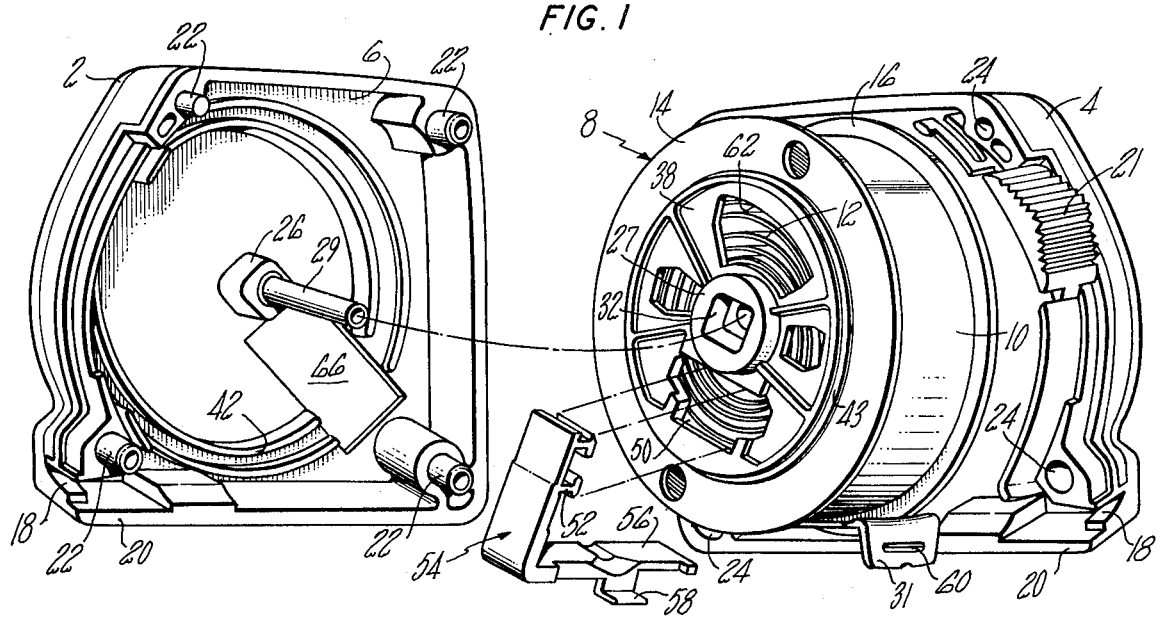

COILABLE RULE AND REPLACEMENT CARTRIDGE THEREFOR

This invention relates generally to coilable rules and more particularly to an improvement in a coilable rule of the type shown and claimed in U.S. Pat. No. 3,716,201 issued Feb. 13, 1973 and assigned to the assignee of the present invention.

One of the objects of the present invention is to provide a coilable rule having an improved replacement cartridge design.

Another object of this invention is to provide an improved replacement cartridge for a coilable rule which is factory preassembled so that it may be easily field assembled in a tape casing without the need for special tools or assembly skills.

Other objects will be in part obvious and in part pointed out more in detail hereinafter.

A better understanding of the invention will be obtained from the following detailed description and the accompanying drawings of an illustrative application of the invention.

In the drawing:

FIG. 1 is an exploded perspective view of a coilable rule constructed in accordance with the present invention; and FIG. 2 is an enlarged fragmentary cross-sectional view of the coilable rule of FIG. 1.

Referring to the drawings in detail, there is illustrated a coilable rule embodying the present invention. The casing for the coilable rule comprises a pair of mating casing halves 2 and 4 which join to define a chamber 6 for receiving a spool 8. A measuring blade 10 and a recoil spring 12 are mounted on the spool with the measuring blade 10 being supported in coiled position on an annular rim 13 of the spool 8. The spool 8 also provides radial side walls or flanges 14, 16 for confining the coiled measuring blade 10 against lateral movement. The casing is provided with a mouth 18 adjacent its bottom wall 20 through which the measuring blade 10 is extended and retracted.

As shown, the coilable rule is provided with a manually operated brake member 21 to lock the tape blade 10 in its extended positions as more fully disclosed and claimed in U.S. Pat. No. 3,214,836 assigned to the assignee of the present invention.

The casing halves 2 and 4 are generally mirror images of each other with casing half 2 being provided with posts 22 which are received in mating sockets 24 provided in the casing half 4.

The inner end of the recoil spring 12 is anchored to a cylindrical hub 28 by being inserted in a non-radial slot 30 in the hub. The ends 27 of the hub 28, which may be molded of a suitable plastics material such as nylon, are provided with apertures 32, of square, or other non-circular cross-section, which receive the mating truncated studs 26 respectively provided on the casing halves 2, 4 to hold the hub against rotation while permitting it to be readily removed from the casing for replacement.

The hub 28 is hollow to receive the cylindrical post 29 projecting from the stud 26 of casing half 2.

The inner end of the measuring blade 10 is connected to the outer end of the recoil spring 12 which extends through a window of the drum or rim 13 so that it is retracted into coiled position under the bias of recoil spring 12. The free end of the measuring blade is provided with a hook 31 so that the free end of the blade is not fully retracted into the casing.

The spool 8 is provided with a single radial side wall or flange 36 which is journaled on one end of the hub 28, as shown in FIG. 2, so that the spool may rotate relative to the stationary hub as the blade is extended and retracted.

It will be observed that the left end of the hub 28 is provided with an enlarged integral radial flange 38 which is radially aligned with the free end of the annular rim 13, the outer periphery of radial flange 38 being spaced from the annular rim 13 by a large annular gap 40 so as to reduce the possibility for contact therebetween. Thus the spool 8 is journaled on the hub 28 by a unitary bearing construction so that the spool 8 is self-aligning and its position in the casing is determined by the straight portion of the blade which extends through the mouth 18 of the casing to accommodate possible minor misalignments which might occur in the manufacture of the tape rule. In addition, by virtue of the gap 40, friction between the flange 38 and the spool 8 is obviated and the journaling of the spool 8 on the hub 28 at a point close to the center of rotation minimizes the moment arm of the frictional forces between the spool and the hub.

It will be observed that the casing half 2 is provided with an annular rib 42 which may engage a mating annular abutment 43 on the spool 8 to limit the maximum tilting of the spool 8 within the casing.

Flange 36 of spool 8 provides a plurality of cylindrical posts 44 which are aligned with the annular rim 13 of the spool and pivotally mount an automatic speed control brakes 46 which engages a peripheral flange 48 on the casing half 4 during recoil as disclosed and claimed in U.S. Pat. No. 3,889,897, assigned to the assignee of the present invention.

By placing the posts 44 in alignment with the annular rim 13, the posts 44 are reinforced by the annular rim 13 and thereby permit a minimum wall thickness of the flange 36 of spool 8.

As best shown in FIG. 1, the radial flange 38 of the hub 28 is provided with a plurality of apertures. One of these apertures 50 is non-circularly shaped and dimensioned to receive the resilient fingers 52 of the keeper 54. The keeper 54 is provided with a laterally projecting arm 56 which overlies the coiled portion of tape 10 on spool 8 and is engaged by the hook 31 of the tape blade to maintain the convolutions of the coiled portion of the tape 10 in coiled position after the spring is factory adjusted to the desired tension. The keeper arm 56 is provided with a tab 58 which automatically enters into the slot 60 of the tape hook to prevent the tape hook from sliding laterally off the free end of the keeper arm 56 after factory assembly.

If desired, one or more of the other apertures, such as aperture 62 may be shaped and dimensioned to receive the resilient fingers 52 of the keeper so that the tension of the recoil spring 12 may be adjusted by amounts less than that corresponding to a full rotation of the hook 31 relative to the hub.

The ends of the fingers 52 are provided with oppositely directed shoulders 64 which lock the keeper firmaly installed on the hub 28 after assembly thereon.

As shown in FIG. 1, the inner wall of casing half 2 is provided with a radial recess 66 to receive the keeper 54 when the preassembled cartridge is installed in the tape casing. All that is required to assemble the cartridge is to place the hub 28 over the post 29 of casing half 2 with the keeper aligned with the recess 66 and extend the hook 31 through the mouth 18 of the casing so that it engages the outside wall of the casing adjacent the mouth 18. The casing half 4 is then positioned over the spool and the fastening screws applied through the apertures 24 to secure the casing halves together. Another screw 68 is applied through a central aperture in casing half 4 to engage the hollow end of the post 29 to complete the assembly.

As shown in FIG. 2, the cylindrical post 29 secured to the casing half 2 is longer than the axial dimension of the corresponding axially facing shoulders of the hub 28. Thus, when the post 29 is bottomed against the truncated stud 26, there is an axial clearance of about, say, 0.010 inch between the hub 28 and the stud 26. It has been found that providing this axial clearance prevents breakage of the hub in the event that the tape rule is dropped during use to subject it to severe shock.

From the foregoing, it will be readily apparent that the present invention provides an improved coilable rule having a free hub construction which is more durable than prior constructions. It is further apparent that the invention provides for the foolproof repair of a coilable rule by a factory adjusted replacement cartridge and provides improved performance in a coilable rule.

As will be apparent to persons skilled in the art, various modifications, adaptations and variations can be made without departing from the teachings of the present invention.

We claim:

1. A replacement cartridge for a coilable rule having a housing providing a mouth for passing a resilient measuring blade therethrough, said replacement cartridge comprising a spool and a non-rotatable removable hub, said spool having an annular rim bounded by side walls for mounting the coiled portion of the measuring blade, one of said side walls extending toward the axis of rotation of said spool and providing a central aperture for journaling the spool on one end of the hub, said hub having an outwardly extending flange fixed to the other end of the hub substantially in alignment with the other side wall of the spool to define an annular chamber with said hub and said spool, a recoil spring within said chamber, one end of said recoil spring being secured to the non-rotatable hub and the other end being connected to the end of the measuring blade for recoiling the same, said annular rim of the spool being spaced from the spool to define an annular clearance sufficient to prevent frictional contact therebetween to provide a unitary bearing construction for the spool which is self-aligning with the mouth of the housing by the uncoiled portion of the measuring blade extending through the mouth.

2. The device of claim 1 wherein the outwardly extending flange of said hub is provided with a non-circular aperture, and a keeper having a latch is resiliently received within said aperture, said keeper having a laterally extending arm overlying the spool, an angularly extending hook at the end of the measuring blade engageable with said keeper to maintain the hub against rotation relative to the spool against the spring force of said recoil spring.

3. The device of claim 2 wherein the laterally extending arm is provided with a tab and the hook is provided with an aperture received in said tab to prevent the hook from moving laterally relative to the arm.

4. A coilable measuring rule having a housing providing a cavity therein for receiving a replacement cartridge according to claim 1.

5. The device of claim 4 wherein the side walls of said housing are provided with aligned non-circular confronting studs, and said hub is provided with non-circular mating recesses at each end thereof engageable with said studs for preventing relative rotation therebetween.

6. The device of claim 5 wherein said hub is hollow and one of said studs is provided with a central post which abuts the confronting stud on the opposite side wall to fix the distance between the studs, said hub having end walls engageable with shoulders on said studs, said end walls having an axial spacing less than the distance between said shoulders to provide an axial clearance therewith.

7. The device of claim 4 wherein said housing is provided with annular shoulder means engageable with said spool to limit the maximum tilt of the spool relative to the casing.

* * * * *